US012786119B2

(12) United States Patent
Shah et al.

(10) Patent No.: US 12,786,119 B2
(45) Date of Patent: Nov. 3, 2026

(54) TRACKING BEHIND-THE-SERVICE ENDPOINTS IN A SERVICE CHAIN

(71) Applicant: Cisco Technology, Inc., San Jose, CA (US)

(72) Inventors: Avinash Shah, Pleasanton, CA (US); Pradeepan Kannawadi, Dublin, CA (US); Pritam Baruah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 18/608,604

(22) Filed: Mar. 18, 2024

(65) Prior Publication Data

US 2025/0202817 A1 Jun. 19, 2025

Related U.S. Application Data

(60) Provisional application No. 63/609,831, filed on Dec. 13, 2023.

(51) Int. Cl.
*H04L 45/741* (2022.01)
*H04L 61/5007* (2022.01)

(52) U.S. Cl.
CPC ........ *H04L 45/741* (2013.01); *H04L 61/5007* (2022.05)

(58) Field of Classification Search
CPC .......................... H04L 45/741; H04L 61/5007
See application file for complete search history.

(56) References Cited

U.S. PATENT DOCUMENTS

| | | | | |
|---|---|---|---|---|
| 11,838,199 B1 * | 12/2023 | Berenberg | .......... | H04L 41/0806 |
| 12,047,425 B1 * | 7/2024 | Schornig | ............... | H04L 41/147 |
| 2014/0269380 A1 * | 9/2014 | Rusak | .................. | H04L 49/555 370/252 |

(Continued)

OTHER PUBLICATIONS

Halpern J.E., et al., "Service Function Chaining (SFC) Architecture", RFC 7665, IETF, Oct. 1, 2015, pp. 1-32, XP093120714, Retrieved from https://datatracker.ietf.org/doc/html/rfc7665 on Jan. 17, 2024, Paragraphs [04.3]-[04.8].

(Continued)

*Primary Examiner* — Kostas J Katsikis
(74) *Attorney, Agent, or Firm* — Lee & Hayes, P.C.

(57) ABSTRACT

Techniques for automatically orchestrating routes configured to track behind-the-service endpoints executing in association with service endpoint devices in a service chain. A network controller may be utilized to override a tracker IP address for each HA pair in a service, allowing customers to configure the tracker IP address to be provisioned behind a service they wish to track, such that packets containing the tracker IP address will be forced to go through the service itself, allowing the network to gauge a status of the service (e.g., up, down, etc.). The network controller may be configured to automatically orchestrate a route that causes packets addressed to a service endpoint device hosting a service through an outgoing interface of the endpoint device, into the service, and to a behind-the-service IP address. These techniques may be utilized with tunnel connected services and/or services connected over physical interface(s) (e.g., IPv4 and/or IPv6).

20 Claims, 12 Drawing Sheets

(56) References Cited

U.S. PATENT DOCUMENTS

| | | | | |
|---|---|---|---|---|
| 2015/0085870 | A1 | 3/2015 | Narasimha et al. | |
| 2017/0019335 | A1 | 1/2017 | Schultz et al. | |
| 2018/0091420 | A1 | 3/2018 | Drake et al. | |
| 2020/0389427 | A1* | 12/2020 | Wells | H04L 61/5038 |
| 2021/0314277 | A1 | 10/2021 | Rolando et al. | |
| 2022/0070146 | A1* | 3/2022 | Gerstel | H04L 12/2854 |
| 2023/0117218 | A1* | 4/2023 | Navon | H04L 12/4641 709/238 |
| 2023/0168917 | A1 | 6/2023 | Kavathia et al. | |
| 2023/0379190 | A1 | 11/2023 | Gounder et al. | |

OTHER PUBLICATIONS

International Search Report and Written Opinion for International Application No. PCT/US2024/059381, mailed Feb. 17, 2025, 13 Pages.

* cited by examiner

500

TRACKING BEHIND-THE-SERVICE ENDPOINTS IN A SERVICE CHAIN

CROSS REFERENCE TO RELATED APPLICATIONS

This application claims priority to U.S. Provisional Patent Application No. 63/609,831, filed Dec. 13, 2023, the entire contents of which are incorporated herein by reference.

TECHNICAL FIELD

The present disclosure relates generally automatically orchestrating routes configured to track behind-the-service endpoints executing in association with service endpoint devices in a service chain.

BACKGROUND

Service providers offer computing-based services, or solutions, to provide users with access to computing resources to fulfill users' computing resource needs without having to invent in and maintain computing infrastructure required to implement the services. These service providers often maintain networks of data centers which house servers, routers, and other devices that provide computing resources to users such as compute resources, networking resources, storage resources, database resources, application resources, security resources, and so forth. The solutions offered by service providers may include a wide range of services that may be fine-tuned to meet a user's needs. Additionally, in cloud-native environments, it is common to operationalize services in various ways such that they are reachable via a tunnel or via physical interfaces associated with service endpoint devices hosting the services. While the availability of these services allows for increased security without additional computing needs of a user, there is a need to verify that such services are performing correctly and that the data path is working as desired. Therefore, it is very important to keep the status of a service chain updated based on the status of the services it offers.

A service chain may be considered down (e.g., non-operational, non-responsive, offline, etc.) if any of the services offered by the service chain are down. A service is considered down if all of the available paths toward the service are down. That is, a single service going down brings the entire service chain down. It may be possible to ping internet protocol (IP) addresses associated with the service endpoints to determine if the endpoint is reachable. However, simply pinging the endpoint on which the service resides does not confirm that the service itself is executing correctly (e.g., not down). As such, a customer may be subject to using additional mechanisms to track the health of such services and/or be subject to extra maintenance and orchestration of routes in association with a service chaining hub, a service endpoint, and/or the service itself. Thus, there is a need to automatically track the status of the individual services within a service chain without additional orchestration by the customer.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
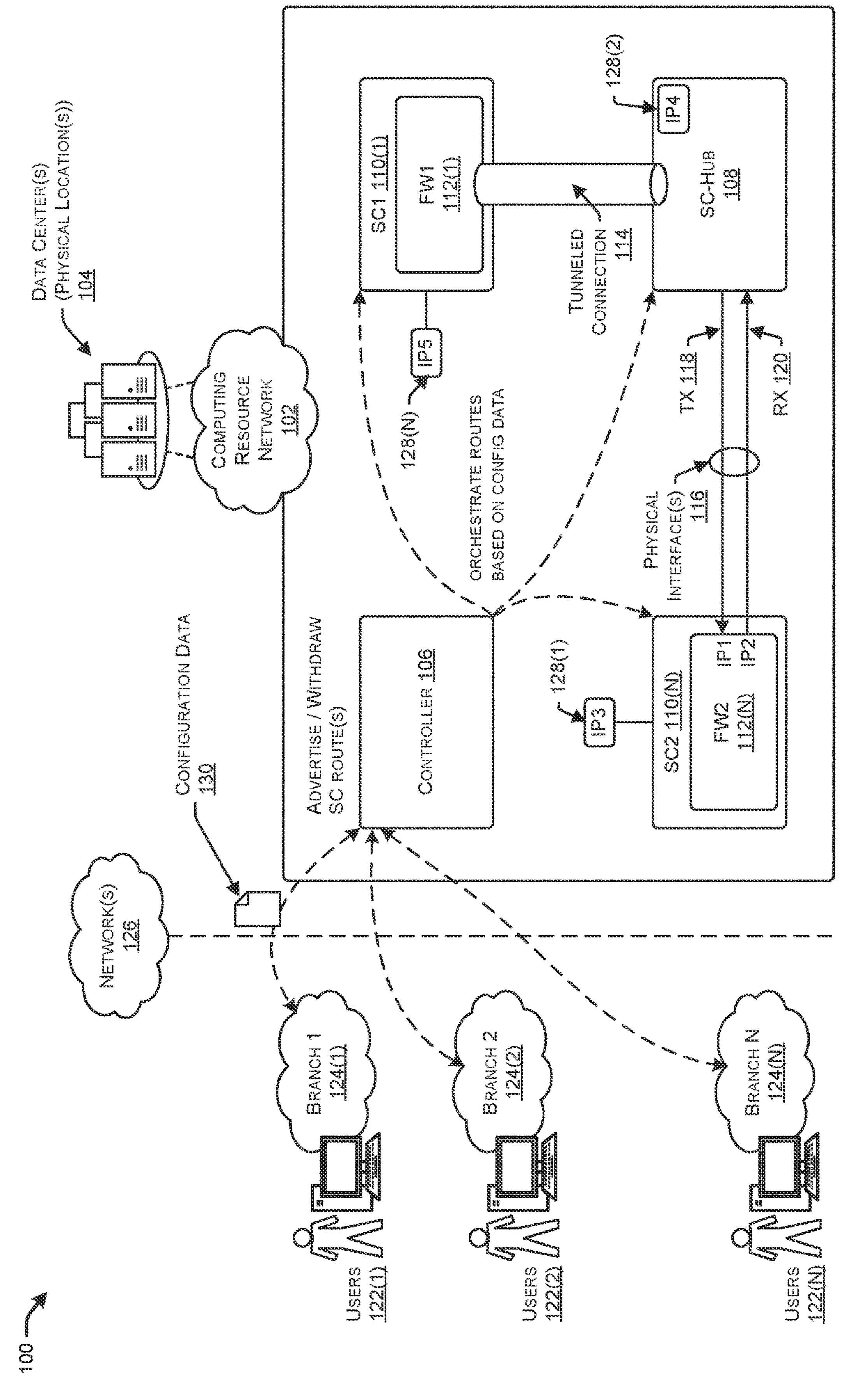
FIG. 1 illustrates a system-architecture diagram of an example environment for a computing resource network hosting service chain(s) to automatically orchestrate routes for behind-the-service IP tracking.

This disclosure describes method(s) for automatically orchestrating routes configured to track behind-the-service endpoints executing in association with service endpoint devices in a service chain. The method includes identifying, by a network controller associated with a computing resource network, a service executing on a service endpoint device associated with the computing resource network. Additionally, or alternatively, the method includes determining a first internet protocol (IP) address associated with the service endpoint device. Additionally, or alternatively, the method includes determining an outgoing interface associated with the service endpoint device. In some examples, the outgoing interface may be configured to transmit network traffic to the service. Additionally, or alternatively, the method includes installing, by the network controller, a second IP address in association with the service. Additionally, or alternatively, the method includes installing, by the network controller, a route in association with the service. In some examples, the route may be configured to transmit packets addressed to the first IP address through the outgoing interface and to the second IP address.

Additionally, or alternatively, the method includes identifying, by a network controller associated with a computing resource network, a service executing on a service endpoint device associated with the computing resource network. Additionally, or alternatively, the method includes determining a tunnel interface associated with the service endpoint device. In some examples, the tunnel interface may be configured to transmit network traffic to the service. Additionally, or alternatively, the method includes installing, by the network controller, an IP address in association with the service. Additionally, or alternatively, the method includes installing, by the network controller, a route in association with the service. In some examples, the route may be configured to transmit packets addressed to the service endpoint device through the tunnel interface and to the IP address.

Additionally, or alternatively, the method includes identifying, by a network controller associated with a computing resource network, a service executing on a service endpoint device associated with the computing resource network. Additionally, or alternatively, the method includes determining a first internet protocol (IP) address associated with the service endpoint device. Additionally, or alternatively, the method includes determining an outgoing interface associated with the service endpoint device. In some examples, the outgoing interface may be configured to transmit network traffic to the service. Additionally, or alternatively, the method includes installing, by the network controller, a second IP address in association with a service hub associated with the computing resource network. Additionally, or alternatively, the method includes installing, by the network controller, a route in association with the service. In some examples, the route may be configured to transmit packets addressed to the first IP address through the outgoing interface and to the second IP address.

Additionally, the techniques described herein may be performed by a system and/or device having non-transitory computer-readable media storing computer-executable instructions that, when executed by one or more processors, performs the method described above.

Example Embodiments

As previously described, typical service chain deployments track the status of service(s) offered by service chain(s) in order to determine the health of such service chain(s). While it is possible to ping an IP address associated with a given service endpoint to determine whether the service endpoint is reachable, simply pinging the service endpoint on which a given service resides does not provide a status of the service itself. For example, pinging the endpoint hosting the service does not confirm that the service itself is executing correctly (e.g., not down). This disclosure describes techniques for automatically orchestrating routes configured to track behind-the-service endpoints executing in association with service endpoint devices in a service chain. In some examples, a network controller provisioned in a computing resource network may be configured to automatically orchestrate routes for a given service to enable behind-the-service IP tracking. That is, the network controller may be configured to override a tracker IP address for each high-availability (HA) pair in a service, allowing customers of branch networks that are utilizing the service chain(s) offered by the computing resource network to have multiple paths to test toward a given service and determine a status of the service. Additionally, the network controller may configure the tracker IP address to be provisioned behind the service, such that packets (e.g., probe packets) containing the tracker IP address will be forced to go through the service itself and confirm that the service is functioning properly before advertising the routes to branch network(s). That is, the network controller may be configured to automatically orchestrate route(s) in association with a service, where the route(s) may transmit packets addressed to a service endpoint device on which a given service is executing through an outgoing interface associated with the service and to a behind-the-service IP address associated with the service. In some examples, customers may configure one or more behind-the-service IP addresses (or endpoints) for service status tracking purposes by interacting with one or more user interfaces to provide input data that is utilized to generate a configuration file (or configuration data). The network controller may be configured to automatically orchestrate behind-the-service IP addresses for service(s) in the computing resource network based on the configuration files.

A computing resource network may be configured with a network controller, one or more service chain hub(s), and/or one or more service endpoint device(s) hosting one or more service(s). In some examples, the tracker IP for each HA pair associated with a given service may be overridden, allowing a user to have multiple paths to test towards the service. That is, users may interact with one or more user interface(s) described herein to input route information (also referred to herein as connection parameters) associated with a given service. In some examples, the route information may include, but is not limited to, an IP address associated with a service endpoint device, an outgoing interface associated with the service, and/or an IP address associated with the service (e.g., the behind-the-service IP). Additionally, or alternatively, the route information may also indicate a connection type associated with a given service or a service endpoint device on which the service is hosted, such as, for example, a tunneled connection and/or connected over physical interface. Additionally, or alternatively, the route information may indicate the type of IP address associated with a given service, such as, for example, IP version 4 (IPv4) and/or IP version 6 (IPv6). This route information may be utilized by the network controller to automatically install one or more behind-the-service IP addresses (also referred to herein as behind-the-service endpoints) in association with a service. For example, the network controller may be configured to install an IP address in association with a first service endpoint device executing a first service. The IP address may be provisioned behind the service, such that, to reach the IP address, packets must first pass through the actual service, verifying that the service is functioning properly. That is, the network controller may install a route in association with the service configured to transmit packets addressed to the service endpoint device through the outgoing interface of the service and to the behind-the-service IP address that was installed in association with the service. In some examples, users may configure any number of behind-the-service IP addresses 1-N for a given service, where N may be any integer greater than 1. Behind-the-service IP addresses may be provisioned as an endpoint executing on a service endpoint device, an endpoint executing in association with the service, and/or an endpoint provisioned on a service chain hub.

Take, for example, a computing resource network offering various service chaining capabilities described herein. The computing resource network may include a network controller, at least one service chain hub, a first service chain hosting a first firewall and connected to the service chain hub over a physical interface (e.g., IPv4 or IPv6), and/or a second service chain hosting a second firewall and connected to the service chain hub over a tunneled connection (e.g., IP secure (IPsec), generic routing encapsulation (GRE), virtual extensible local area network (VXLAN), generic network virtualization encapsulation (GENEVE), and/or the like). In some examples, users may leverage the service chaining capabilities offered by the computing resource network via one or more branch(es) communicatively coupled to the computing resource network. That is, the network controller may determine which service chaining routes to advertise to the branch(es) from the service chain hub. Only routes to service chains that have been determined are functioning properly should be advertised to the branch(es). As such, the network controller may be configured to periodically determine a status of the service(s) offered by a service chain using the behind-the-service IP tracking techniques described herein. A user may configure behind-the-service IP addresses (or endpoints) for services by providing input to generate a configuration file that may be consumed by the network controller.

A user of a first branch network connected to the computing resource network and registered for use of the service chaining functionality offered may access a service chain attachment gateway dashboard represented by one or more user interfaces configured to receive input indicating route information. As previously described, the route information may be utilized by the network controller to orchestrate routes to behind-the-service IP addresses for service status tracking. In some examples, the user interfaces may include one or more fields for capturing the route information, such as, for example, a name field (e.g., indicating a name of the behind-the-service endpoint being provisioned), a description field (e.g., indicating a description of the behind-the-service endpoint being provisioned), and/or a connection type selection (e.g., IPv4, IPv6, or tunneled connection). In examples where a physical interface connection is selected in the connection type selection (e.g., an IPv4 or IPv6 interface connection), the user interface(s) may also include a service endpoint IP address field (e.g., IPv4 or IPv6), an interface field (e.g., indicating the type of physical interface utilized, such as, for example, gigabit ethernet), and/or a tracker parameters toggle. Additionally, or alternatively, in examples where a tunneled connection is selected in the connection type selection, the user interface(s) may include an interface field (e.g., indicating the type of tunneled connection interface utilized) and/or a tracker parameters toggle. In examples where the tracker parameters toggle is set to on (e.g., tracking is enabled), the user interface(s) may include a behind-the-service IP field (also referred to as a tracker endpoint field) and/or a behind the service IP type toggle (e.g., IPv4 or IPv6). Additionally, or alternatively, in examples where the tracker parameters toggle is set to on, the user interface(s) may include a tracker name field and/or a tracker type field.

Once the route information is received, a configuration file may be generated. The network controller may be configured to consume the configuration file and automatically install behind-the-service addresses and/or orchestrate routes in association with the services. For example, the network controller may utilize an endpoint tracker portion of the configuration file to determine and/or install a behind-the-service IP address in association with the service. Additionally, or alternatively, the network controller may utilize an HA pair portion of the configuration file to configure a route in association with the service. For instance, the network controller may determine a first IP address associated with a service endpoint device hosting the service and/or an outgoing interface associated with the service endpoint device. The network controller may then automatically orchestrate a route for the service, such that packets addressed to the first IP address (e.g., to the service endpoint device) are transmitted through the outgoing interface of the service endpoint device (e.g., into the service) and to the behind-the-service IP address that was installed in association with the service. Additionally, or alternatively, in examples where a tunneled connection is utilized, the network controller may automatically orchestrate a route for the service, such that packets addressed to the service endpoint device that is hosting the service are transmitted through the tunnel interface (e.g., into the service) and to the behind-the-service IP address that was installed in association with the service. The behind-the-service IP address may be configured as a loopback address of the service, such that the packets are processed by the service prior to reaching the endpoint, thus providing an operational state of the service (e.g., up, down, etc.). Additionally, or alternatively, the behind-the-service IP address may be configured as an endpoint associated with the service chain hub, such that the packets are processed by the service and then sent back to the service chain hub, thus providing an operational state of the service.

As described herein, a computing-based, network-based, cloud-based service, network device, can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to maintaining and/or managing service chains. For instance, the techniques described herein include overriding an HA pair in a service with a tracker IP address that is provisioned behind a service executing on a service endpoint device. By overriding HA pair(s) in a service, a user may configure multiple paths to test toward the service. Additionally, given that the tracker IP address is provisioned behind the service, overriding the HA pair will ensure that the service is functioning properly and ready to process traffic prior to advertising the service to branches. Additionally, the techniques described herein include automatically orchestrating a custom route using the service IP endpoint and service outgoing interface to force the tracker packets to the behind-the-service IP address. This reduces work on network admins and prevents networking errors that otherwise may lead to dead paths through the network, resulting in traffic loss. By tracking behind-the-service endpoints IP addresses, the status of a service can be determined, which results in a more reliable network as the status indicates whether the service is functioning correctly rather than simply whether the endpoint on which it is executing on is reachable. Additionally, network security is increased as the status of service chains may be readily available to branches. Moreover, by forcing the tracker packets over the outgoing interface of the service endpoint device where the service endpoint is configured, an additional route lookup (e.g., a lookup to determine the actual service endpoint) on the device is avoided and/or the user need not configure any additional routes for the behind-the-service endpoint. This results in reduced computing costs, and increased processing speeds by network devices.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 for a computing resource network 102 hosting service chain(s) to automatically orchestrate routes for behind-the-service IP tracking. Generally, the computing resource network 102 may include devices that are housed or located in one or more data centers 104 that may be located at different physical locations. For instance, the computing resource network 102 may be supported by networks of devices in a public cloud computing platform, a private/enterprise computing platform, and/or any combination thereof. The one or more data centers 104 may be physical facilities or buildings located across geographic areas that are designated to store networked devices that are part of the computing resource network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the computing resource network 102 may not be located in explicitly defined data centers 104 and, rather, may be located in other locations or buildings.

The computing resource network 102 may include a network controller 106, at least one service chain hub (SC-hub) 108, and/or one or more service chains 110(1)-(N), where N may be any integer greater than 1. Although only one SC-hub 108 is illustrated in FIG. 1, it should be understood that the computing resource network 102 may include any number of SC-hub(s) 108 from 1-N, where N may be any integer greater than 1. In some examples, a first service chain 110(1) hosting a first service (e.g., a first firewall service) 112(1) may be connected to the SC-hub 108 over a tunneled connection (e.g., IP secure (IPsec), generic routing encapsulation (GRE), virtual extensible local area network (VXLAN), generic network virtualization encapsulation (GENEVE), and/or the like). Additionally, or alternatively, a second service chain 110(N) hosting a second service (e.g., a second firewall service) 112(N) may be connected to the SC-hub 108 over a physical interface (e.g., IPv4 or IPv6) comprising a transmit (Tx) interface 118 and/or a receive (Rx) interface 120 (with respect to the SC-hub 108).

The computing resource network 102 may provide service chaining capabilities to users 122(1)-(N) via branch(es) 124(1)-(N) connected to the computing resource network 102 over one or more networks 126, such as the internet, where N may be any integer greater than 1. The computing resource network 102 and/or the networks 126, may each respectively include one or more networks implemented by any viable communication technology, such as wired and/or wireless modalities and/or technologies. The computing resource network 102 and/or the networks 126 may each include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The computing resource network 102 may include devices, virtual resources, or other nodes that relay packets from one network segment to another by nodes in the computer network.

As previously mentioned, users 122 may leverage the service chaining capabilities offered by the computing resource network 102 via the one or more branch(es) 124 communicatively coupled to the computing resource network 102. For instance, the network controller 106 may determine which service chaining routes to advertise to the branch(es) 124 from the service chain hub 108. Only routes to service chains 110 that have been determined are functioning properly should be advertised to the branch(es) 124. As such, the network controller 106 may be configured to periodically determine a status of the service(s) offered by a service chain using behind-the-service IP tracking techniques described herein. For instance, a user 122 may configure behind-the-service IP addresses 128(1)-(N) (or endpoints) for firewalls (also referred to herein as services) 112 by providing input to generate a configuration file 130 that may be consumed by the network controller 106.

The network controller 106 may receive a configuration file 130 from a user 122(1) of a branch network 124(1). In some examples, the user 122(1) may interact with one or more user interfaces to provide input data (e.g., such as next hop input data) that is utilized to generate the configuration file 130. For example, the user 122(1) may interact with the user interface(s) 300 and/or 320 as described with respect to FIGS. 3A and 3B. The configuration file 130 is described in more detail below with respect to FIG. 2. Additionally, or alternatively, network controller 106 may consume the configuration file 130 and automatically install one or more behind-the-service endpoints 128(1)-(N) and/or orchestrate one or more routes in association with a given service and/or a given behind-the-service endpoint 128.

Figure 2:
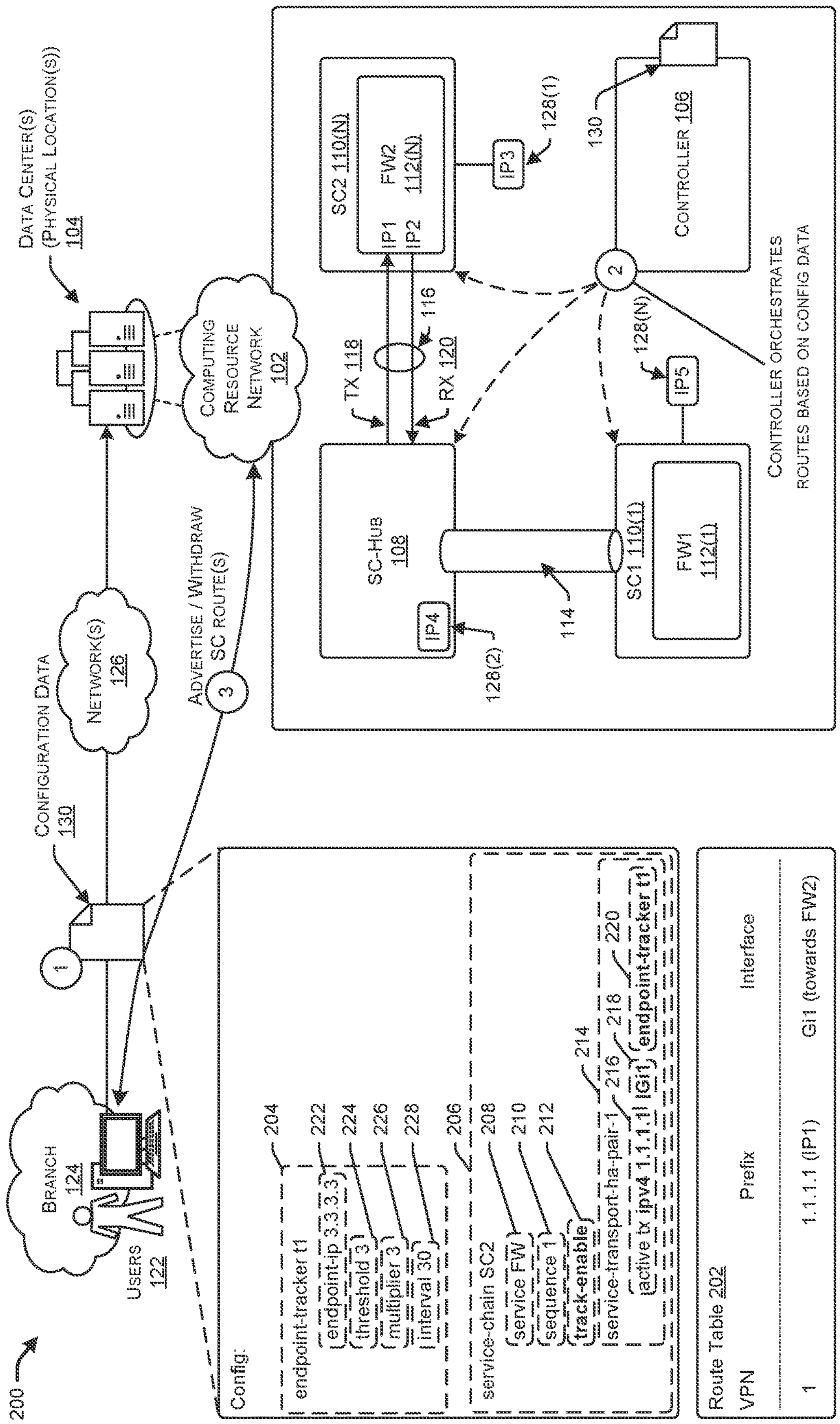
FIG. 2 illustrates another system-architecture diagram of an example environment and flow for a computing resource network hosting service chain(s) to automatically orchestrate routes for behind-the-service IP tracking.

FIG. 2 illustrates another system-architecture diagram of an example environment 200 for a computing resource network 102 hosting service chain(s) 110 to automatically orchestrate routes for tracking behind-the-service endpoints 128. In some examples, the example environment 200, and the components thereof, may substantially correspond to the example environment 100, and the components thereof, as illustrated in FIG. 1. As illustrated, FIG. 2 includes a route table 202 for exemplary purposes. As previously mentioned with respect to FIG. 1, users 122 may leverage the service chaining capabilities offered by the computing resource network 102 via the one or more branch(es) 124 communicatively coupled to the computing resource network 102. An example flow for a network controller to automatically orchestrate routes for behind-the-service endpoint tracking is described below.

At "1," the network controller 106 may receive a configuration file 130 from a branch network 124. In some examples, a user 122 may configure behind-the-service IP addresses 128(1)-(N) (or endpoints) for firewalls (also referred to herein as services) 112(1)-(N) by providing input to generate the configuration file 130 that may be consumed by the network controller 106. In some examples, the user 122 may interact with one or more user interfaces to provide input data (e.g., such as next hop input data) that is utilized to generate the configuration file 130. For example, the user 122(1) may interact with the user interface(s) 300 and/or 320 as described with respect to FIGS. 3A and 3B.

Figure 3A:
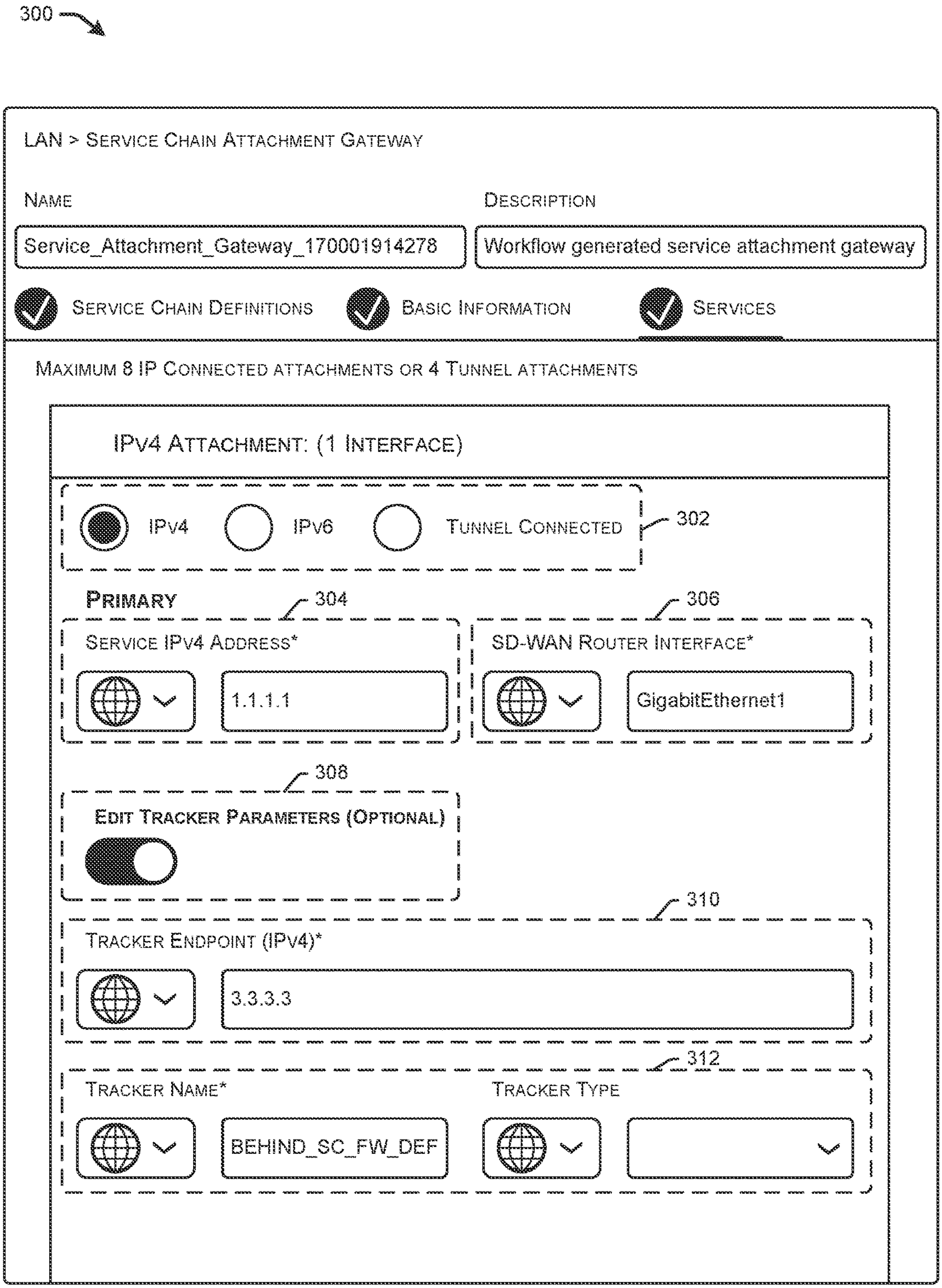
FIG. 3A illustrates a schematic diagram of an example user interface for receiving input to configure behind-the-service IP tracking for IPv4 and/or IPv6 connected services over physical interface(s).

In some examples, the user 122 may wish to provision behind-the-service IP tracking for FW2 112(N) utilizing behind-the-service IP 128(1) tracking for IPv4 and/or IPv6 connected services over physical interface(s) 116. Turning to FIG. 3A, FIG. 3A illustrates a schematic diagram of an example user interface 300 for receiving input to configure behind-the-service IP 128 tracking for IPv4 and/or IPv6 connected services over physical interface(s) 114. The user interface 300, or a user interface similar thereto, as represented in FIG. 3A may be configured to be displayed on any kind of user device having access to the computing resource network 102 via the network(s) 126, such as, the internet, for example.

As previously described, the user 122 of a branch network 124 connected to the computing resource network 102 and registered for use of the service chaining functionality offered may access a service chain attachment gateway dashboard represented by the user interface 300 configured to receive input indicating route information. As previously described, the route information may be utilized by the network controller 106 to orchestrate routes to behind-the-service IP addresses 128 for service status tracking. In some examples, the user interface 300 may include one or more fields for capturing the route information, such as, for example, a name field (e.g., indicating a name of the behind-the-service endpoint being provisioned), a description field (e.g., indicating a description of the behind-the-service endpoint being provisioned), and/or a connection type selection 302 (e.g., IPv4, IPv6, or tunneled connection). In examples where a physical interface 116 connection is selected in the connection type selection 302 (e.g., an IPv4 or IPv6 interface connection), the user interface(s) 300 may also include a service endpoint IP address field 304 (e.g., IPv4 or IPv6), an interface field 306 (e.g., indicating the type of physical interface utilized, such as, for example, gigabit ethernet), and/or a tracker parameters toggle 308. In examples where the tracker parameters toggle 308 is set to on (e.g., tracking is enabled), the user interface(s) 300 may include a behind-the-service IP field 310 (also referred to as a tracker endpoint field), a tracker name field and/or a tracker type field 312.

Figure 3B:
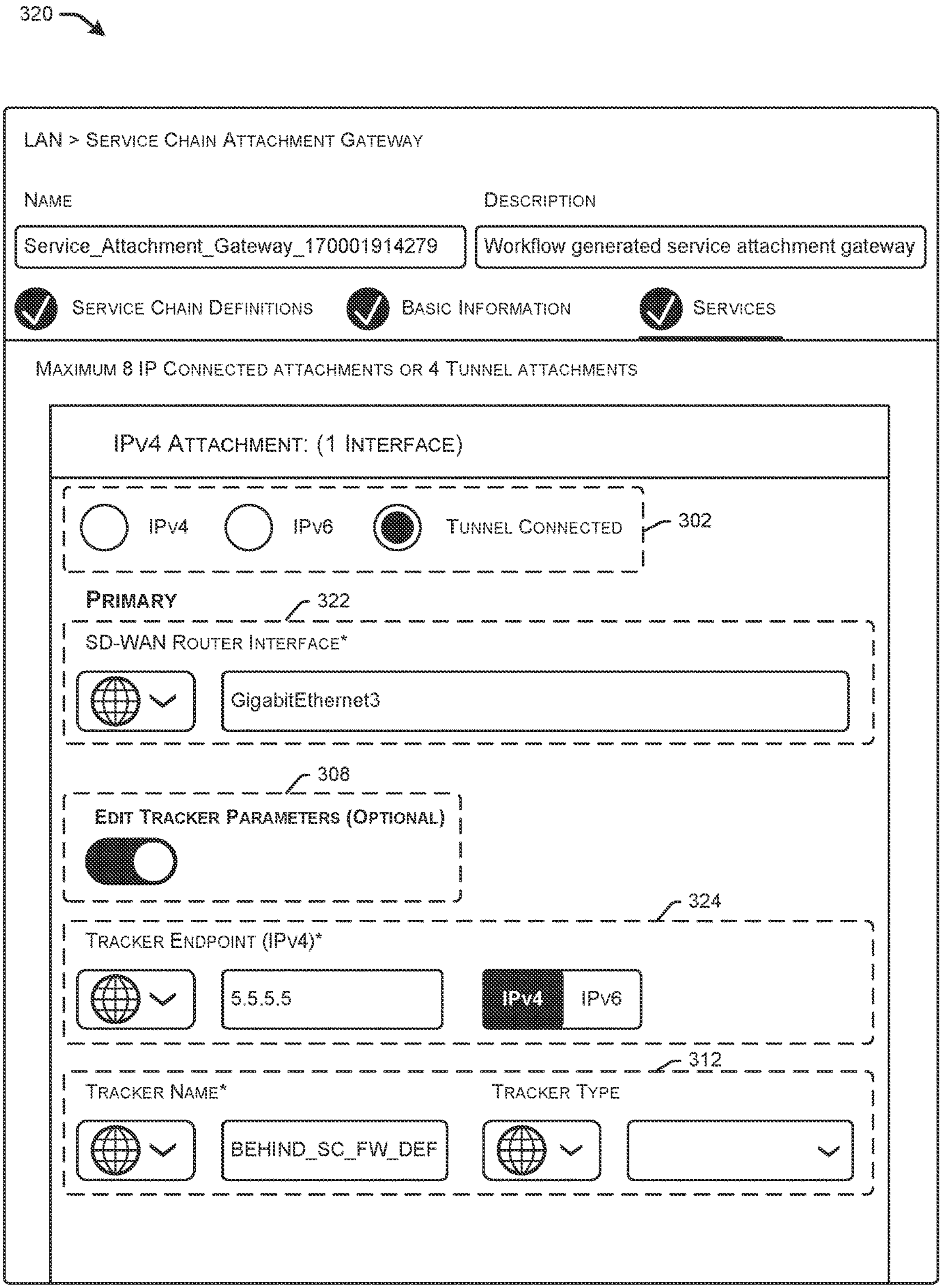
FIG. 3B illustrates a schematic diagram of an example user interface for receiving input to configure behind-the-service IP tracking for tunneled connection services.

Additionally, or alternatively, the user 122 may wish to provision behind-the-service IP tracking for FW2 112(1) utilizing behind-the-service IP 128(N) for tunneled connection 114 services. FIG. 3B illustrates a schematic diagram of an example user interface 320 for receiving input to configure behind-the-service IP tracking for tunneled connection services. The user interface 320, or a user interface similar thereto, as represented in FIG. 3B may be configured to be displayed on any kind of user device having access to the computing resource network 102 via the network(s) 126, such as, the internet, for example.

As previously described, the user 122 of a branch network 124 connected to the computing resource network 102 and registered for use of the service chaining functionality offered may access a service chain attachment gateway dashboard represented by the user interface 320 configured to receive input indicating route information. As previously described, the route information may be utilized by the network controller 106 to orchestrate routes to behind-the-service IP addresses 128 for service status tracking. In some examples, the user interface 320 may include one or more fields for capturing the route information, such as, for example, a name field (e.g., indicating a name of the behind-the-service endpoint being provisioned), a description field (e.g., indicating a description of the behind-the-service endpoint being provisioned), and/or a connection type selection 302 (e.g., IPv4, IPv6, or tunneled connection). In examples where a tunneled connection 114 is selected in the connection type selection 302, the user interface(s) 320 may include an interface field 322 (e.g., indicating the type of tunneled connection 114 interface utilized) and/or a tracker parameters toggle 308. In examples where the tracker parameters toggle 308 is set to on (e.g., tracking is enabled), the user interface(s) 320 may include a behind-the-service IP field 324 (also referred to as a tracker endpoint field). In some examples, the behind-the-service IP field 324 may include a behind the service IP type toggle 324 (e.g., IPv4 or IPv6). Additionally, or alternatively, in examples where the tracker parameters toggle 308 is set to on, the user interface(s) 320 may include a tracker name field and/or a tracker type field 312.

Returning back to FIG. 2, once the route information is received, a configuration file 130 may be generated. In some examples, the configuration file 130 may comprise one or more endpoint tracker portion(s) 204 and/or one or more service chain portion(s) 206. A service chain portion 206 may include a service indicator 208 indicating the type of the service (e.g., firewall, deep packet inspection, etc.), a sequence indicator 210 indicating the sequence of the service in the service chain, a tracking indicator 212 indicating whether or not tracking is enabled, and/or one or more HA pair portions 214. An HA pair portion 214 may include a transport IP indicator 216 indicating the transport interface IP and/or tunnel interface identifier, an outgoing interface indicator 218, and/or a behind-the-service IP indicator 220. In some examples, the behind-the-service IP indicator 220 may indicate at least one of the endpoint tracker portion(s) 204.

In some examples, an endpoint tracker portion 204 may include an endpoint IP indicator 222 indicating the endpoint for an overridden HA pair as described herein, a threshold indicator 224 indicating a threshold utilized for determining the state of a service (e.g., the state is up if the scaled metric for that route is less than or equal to the threshold and/or the state is down if the scaled metric for that route is greater than or equal to the threshold), a multiplier indicator 226 indicating a number of retries required to resend probe packets before declaring a service down, and/or an interval indicator 228 indicating an interval at which the probes are sent.

At "2," the network controller 106 may consume the configuration file 130 and automatically install one or more behind-the-service endpoints 128(1)-(N) and/or orchestrate one or more routes in association with a given service and/or a given behind-the-service endpoint 128. For example, the network controller may utilize an endpoint tracker portion of the configuration file to determine and/or install a behind-the-service IP address in association with the service. Additionally, or alternatively, the network controller may utilize an HA pair portion of the configuration file to configure a route in association with the service.

Take, for example, the orchestration of IP3 128(1) for tracking behind FW2 112(N). As illustrated by FIG. 2, the configuration file 130 defines an endpoint tracker portion 204 with an endpoint IP indicator 222 targeting the IP address "3.3.3.3". For exemplary purposes, IP address 1.1.1.1 corresponds to IP1 and IP address 3.3.3.3 corresponds to IP3 128(1). Additionally, the configuration file 130 defines SC2 110(N) in the service chain portion 206 and indicating that the service is FW2 112(N) in the service indicator 208. The configuration file 130 also defines the overridden HA pair used for tracking behind the service in the HA pair portion 214. For instance, the HA pair portion 214 indicates a transport IP of the service endpoint device 110(N) executing the service 112(N) (e.g., IP address 1.1.1.1) in the transport IP indicator 216, an outgoing interface of Gil (Gigabit Ethernet 1) towards the service 112(N), and/or the endpoint tracker portion 204 having the endpoint IP indicator 222 targeting IP3 128(1) (e.g., IP address 3.3.3.3).

The network controller 106 may then automatically orchestrate a route for the service 112(N), such that packets addressed to IP1 (e.g., the service endpoint device 110(N) and/or IP address 1.1.1.1) are transmitted through the outgoing interface of the service endpoint device 110(N) (e.g., into the service 112(N)) and to the behind-the-service IP address that was installed in association with the service 112(N), such as, for example, IP3 128(1). Additionally, or alternatively, a behind-the-service IP address IP4 128(2) may be installed on the SC-hub 108, and the network controller 106 may orchestrate another route such that packets addressed to IP1 (e.g., the service endpoint device 110(N) and/or IP address 1.1.1.1) are transmitted through the outgoing interface of the service endpoint device 110(N) (e.g., into the service 112(N)) and to the behind-the-service IP address that was installed in association with the SC-hub 108, such as, for example, IP4 128(2). Additionally, or alternatively, in examples where a tunneled connection 114 is utilized, the network controller 102 may automatically orchestrate a route for a service 112(1), such that packets addressed to the service endpoint device 110(1) that is hosting the service 112(1) are transmitted through the tunnel interface 114 (e.g., into the service 112(1)) and to the behind-the-service IP address that was installed in association with the service 112(1), such as, for example, IP5 128(N).

A behind-the-service IP address 128 may be configured as a loopback address of a service 112, such that the packets are processed by the service 112 prior to reaching the endpoint 128, thus providing an operational state of the service 112 (e.g., up, down, etc.). Additionally, or alternatively, the behind-the-service IP address 128 may be configured as an endpoint 128(2) associated with the service chain hub 108, such that the packets are processed by the service 112 and then sent back to the service chain hub 108, thus providing an operational state of the service 112.

At "3," the network controller 106 may determine which service chaining routes to advertise to the branch(es) 124 from the service chain hub 108. Only routes to service chains 110 that have been determined are functioning properly should be advertised to the branch(es) 124. As such, the network controller 106 may be configured to periodically determine a status of the service(s) 112 offered by a service chain 110 using behind-the-service IP tracking techniques described herein.

FIGS. 4-7 illustrate flow diagrams of example methods 400-700 and that illustrate aspects of the functions performed at least partly by the computing resource network 102 and/or by the respective components within as described in FIGS. 1 and 2. The logical operations described herein with respect to FIGS. 4-7 may be implemented (1) as a sequence of computer-implemented acts or program modules running on a computing system and/or (2) as interconnected machine logic circuits or circuit modules within the computing system. In some examples, the method(s) 400-700 may be performed by a system comprising one or more processors and one or more non-transitory computer-readable media storing computer-executable instructions that, when executed by the one or more processors, cause the one or more processors to perform the method(s) 400-700.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4-7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The portions and/or indicators included in the configuration file 130 may be determined and/or received as user input at one of the user interfaces 300, 320 as described herein with respect to FIGS. 3A and 3B. For instance, the endpoint tracker portion 204 may be included when the edit tracker parameters toggle 308 is switched to on. Additionally, or alternatively, the endpoint IP indicator 222 may correspond to the tracker endpoint field 310 and/or 324. Additionally, or alternatively, the transport IP indicator 216 may correspond to the service endpoint field 304 and/or the outgoing interface indicator 218 may correspond to the outgoing interface field 306 (or 322).

Figure 4:
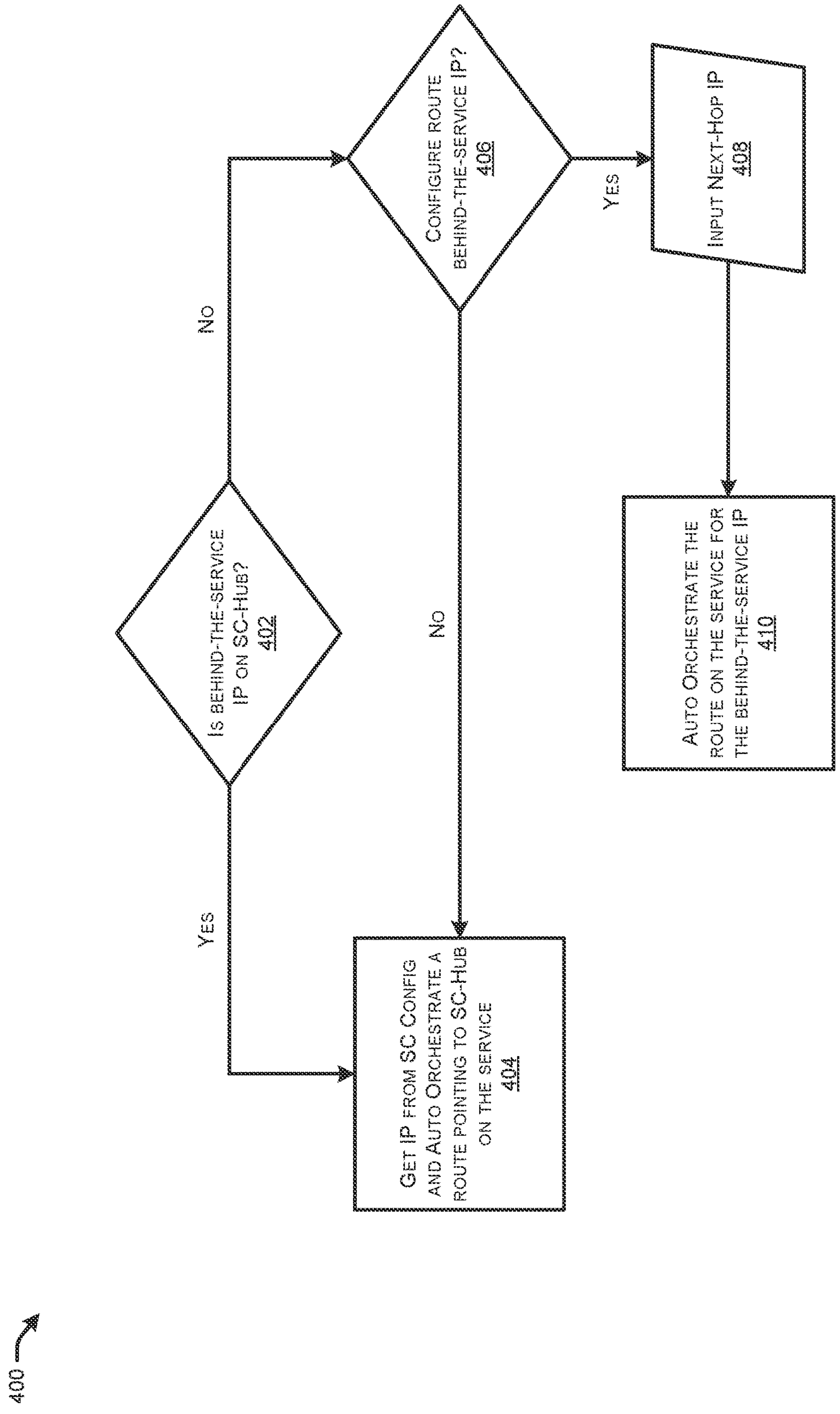
FIG. 4 illustrates a flow diagram of an example method for configuring routes for behind-the-service IP tracking.

FIG. 4 illustrates a flow diagram of an example method 400 for a network controller to configure routes for behind-the-service IP tracking. In some examples, the network controller may correspond to the network controller 102 as described with respect to FIGS. 1 and 2. In some examples, the method 400 begins when the network controller receives and/or consumes a configuration file, such as, for example, the configuration file 130 as described above with respect to FIGS. 1 and 2.

At 402, the method 400 includes determining whether the behind-the-service IP address is on the SC-hub. That is, the network controller may determine where the behind-the-service IP address indicated in the tracker endpoint IP indicator 222 of the configuration file is provisioned. In examples where the network controller determines that the behind-the-service IP address is on the SC-hub, the method 400 proceeds to 404. Alternatively, in examples where the network controller determines that the behind-the-service IP address is somewhere other than the SC-hub, the method 400 proceeds to 406.

At 404, the method 400 includes obtaining the behind-the-service IP from the configuration file and automatically orchestrating a route pointing to the SC-hub on the service. Take, for example, IP4 128(2) as described with respect to FIGS. 1 and 2. Such a route would cause network traffic addressed to IP1 to be forwarded through the outgoing interface of SC2 110(N) into the service 112(N) and to IP4 128(2) at the SC-hub 108.

At 406, the method 400 includes determining whether to configure a behind-the-service route at the service. In examples where users have not input next-hop IP information, the network controller may default to utilizing a behind-the-service IP on the SC-hub for status tracking, and the method 400 may proceed to 404. Additionally, or alternatively, in examples where users have input next-hop IP information to configure a route behind-the-service, the method 400 may proceed to 408.

At 408, the method 400 includes inputting the next-hop IP address for the behind-the-service IP tracking. For instance, the user may be prompted for the next-hop IP address of the endpoint that is behind the service. Additionally, or alternatively, the network controller may identify the next-hop IP address by identifying the tracker endpoint IP indicator 222 in the configuration file.

At 410, the method 400 includes automatically orchestrating the route on the service for the behind-the-service IP tracking. Take, for example, IP3 128(1) as described with respect to FIGS. 1 and 2. Such a route would cause network traffic addressed to IP1 to be forwarded through the outgoing interface of SC2 110(N) into the service 112(N) and to IP3 128(1), where the status of the service 112(N) may be determined and returned to the SC-hub 108 and/or the network controller 106. The status of the service(s) may be leveraged to advertise and/or withdraw routes to branch networks utilizing the service chaining capabilities.

Figure 5:
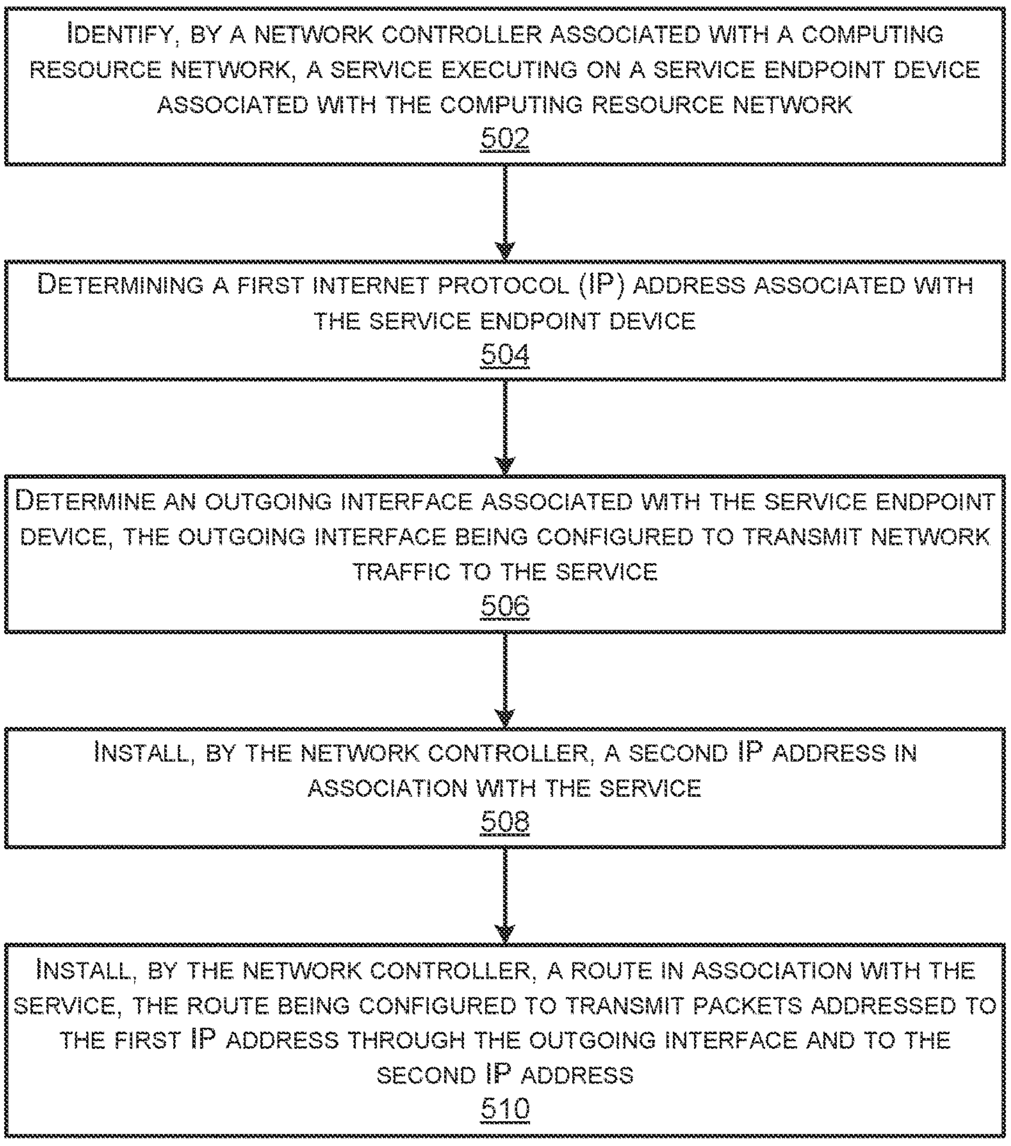
FIG. 5 illustrates a flow diagram of an example method for a network controller to install routes utilized for behind-the-service IP tracking for IPv4 and/or IPv6 connected services over physical interface(s).

FIG. 5 illustrates a flow diagram of an example method 500 for a network controller to install routes utilized for behind-the-service IP tracking for IPv4 and/or IPv6 connected services over physical interface(s). In some examples, the network controller, the service(s), and/or the behind-the-service IP may correspond to the network controller 106, the service(s) 112, and/or the behind-the-service IPs 128 as described with respect to FIGS. 1 and 2.

At 502, the method 500 includes identifying, by a network controller associated with a computing resource network, a service executing on a service endpoint device associated with the computing resource network. In some examples, the computing resource network and/or the service endpoint device may correspond to the computing resource network 102 and/or the service endpoint device(s) 110 as described with respect to FIGS. 1 and 2.

At 504, the method 500 includes determining a first internet protocol (IP) address associated with the service endpoint device. In some examples, the first IP address may correspond to the transport IP indicator 216 as described with respect to FIG. 2.

At 506, the method 500 includes determining an outgoing interface of the service endpoint device, the outgoing interface being configured to transmit network traffic to the service. In some examples, the outgoing interface may correspond to the outgoing interface indicator 218 as described with respect to FIG. 2.

At 508, the method 500 includes installing, by the network controller, a second IP address in association with the service. In some examples, the second IP address may correspond to a behind-the-service IP address 128 as described with respect to FIGS. 1 and 2.

At 510, the method 500 includes installing, by the network controller, a route in association with the service. In some examples, the route may be configured to transmit packets addressed to the first IP address through the outgoing interface and to the second IP address.

In some examples, the second IP address may be configured as a loopback address associated with the service endpoint device.

In some examples, the second IP address may be provisioned as an endpoint executing behind the service on the service endpoint device.

In some examples, the route is a first route. Additionally, or alternatively, the method 500 includes installing a third IP address in association with the service. Additionally, or alternatively, the method 500 includes installing a second route in association with the service. In some examples, the second route may be configured to transmit network traffic addressed to the first IP address through the outgoing interface and to the third IP address.

In some examples, the network traffic may be received from a service hub communicatively coupled to the service endpoint device, and/or the second IP address may be configured as an endpoint executing on the service hub.

Additionally, or alternatively, the method 500 includes receiving route information from a customer device associated with the network traffic. In some examples, the route information may indicate the outgoing interface, the first IP address, and/or the second IP address. Additionally, or alternatively, the method 500 includes based at least in part on receiving the route information determining the outgoing interface, determining the first IP address, and/or installing the second IP address.

In some examples, the packets are probe packets sent from a service hub associated with the service endpoint device, and/or the route is configured to transmit the probe packets addressed to the first IP address through the outgoing interface and to the second IP address. Additionally, or alternatively, the probe packets may be configured to indicate an operational state of the service to the service hub.

In some examples, the first IP address is one of an IP version 4 (IPv4) address or an IP version 6 (IPv6) address.

Figure 6:
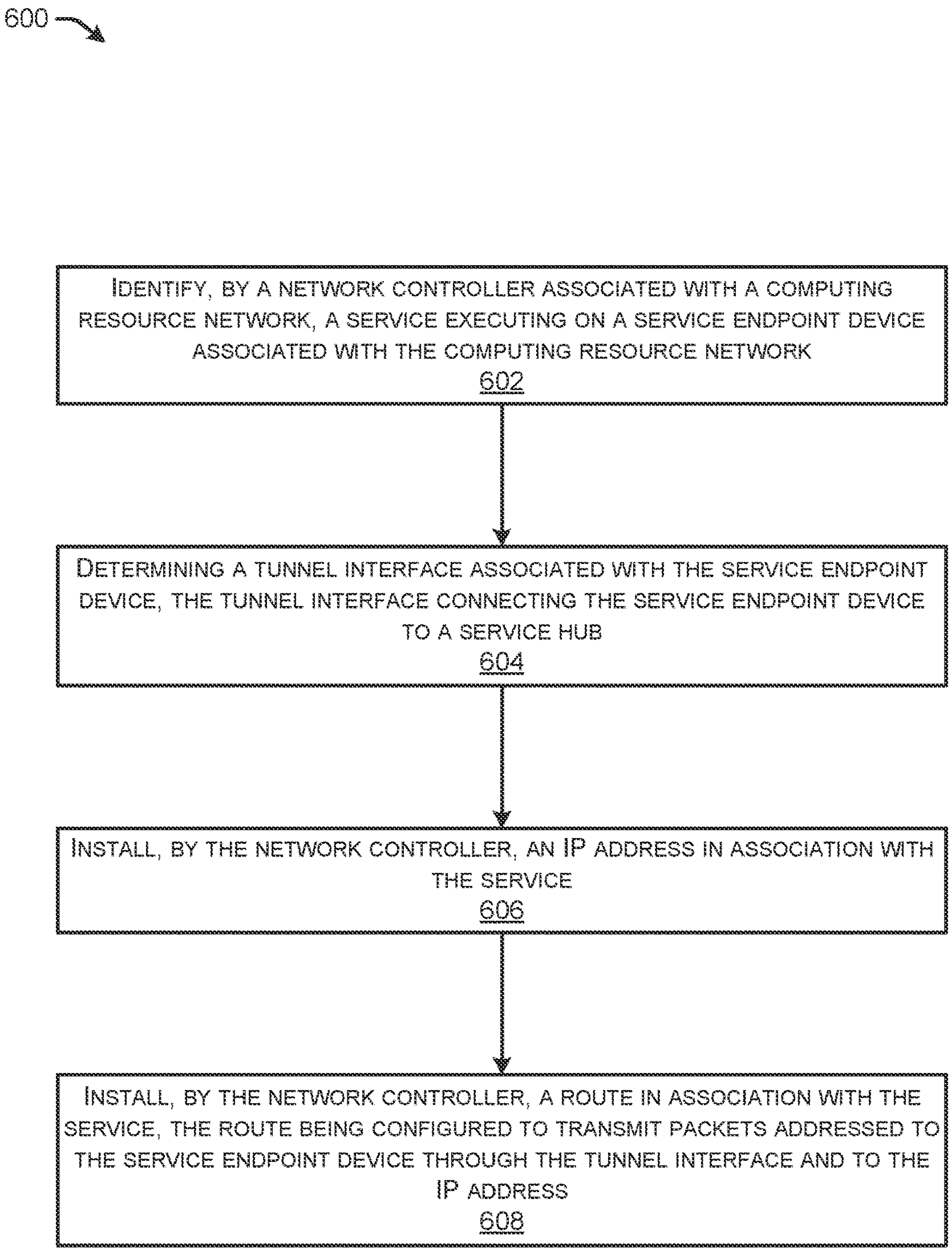
FIG. 6 illustrates a flow diagram of an example method for a network controller to install route(s) utilized for behind-the-service IP tracking for tunneled connection services.

FIG. 6 illustrates a flow diagram of an example method 600 for a network controller to install route(s) utilized for behind-the-service IP tracking for tunneled connection services. In some examples, the network controller, the service(s), and/or the behind-the-service IP may correspond to the network controller 106, the service(s) 112, and/or the behind-the-service IPs 128 as described with respect to FIGS. 1 and 2.

At 602, the method 600 includes identifying, by a network controller associated with a computing resource network, a service executing on a service endpoint device associated with the computing resource network. In some examples, the computing resource network and/or the service endpoint device may correspond to the computing resource network 102 and/or the service endpoint device(s) 110 as described with respect to FIGS. 1 and 2.

At 604, the method 600 includes determining a tunnel interface associated with the service endpoint device, the tunnel interface configured to transmit network traffic to the service. In some examples, the tunnel interface may correspond to the tunneled connection 114 as described with respect to FIGS. 1 and 2.

At 606, the method 600 includes installing, by the network controller, an IP address in association with the service. In some examples, the IP address may correspond to a behind-the-service IP address 128 as described with respect to FIGS. 1 and 2.

At 608, the method 600 includes installing, by the network controller, a route in association with the service. In some examples, the route may be configured to transmit packets addressed to the service endpoint device through the tunnel interface and to the IP address.

In some examples, the IP address is configured as a loopback address associated with the service endpoint device.

In some examples, the IP address is provisioned as an endpoint executing behind the service on the service endpoint device.

In some examples, the network traffic is received from a service hub communicatively coupled to the service endpoint device, and/or the IP address is configured as an endpoint executing on the service hub.

Additionally, or alternatively, the method 600 includes receiving route information from a client device associated with the network traffic. In some examples, the route information indicating the tunnel interface and/or the IP address. Additionally, or alternatively, the method 600 includes based at least in part on receiving the route information determining the tunnel interface and/or installing the IP address.

In some examples, the route may be a first route and/or the IP address may be a first IP address. Additionally, or alternatively, the method 600 includes installing a second IP address in association with a service hub associated with the computing resource network. Additionally, or alternatively, the method 600 includes installing a second route in association with the service. In some examples, the second route may be configured to transmit network traffic addressed to the service endpoint device through the tunnel interface and to the second IP address.

In some examples, the packets are probe packets sent from a service hub associated with the service endpoint device, and/or the route is configured to transmit the probe packets addressed to the service endpoint device through the tunnel interface and to the IP address. Additionally, or alternatively, the probe packets being configured to indicate an operational state of the service to the service hub.

Figure 7:
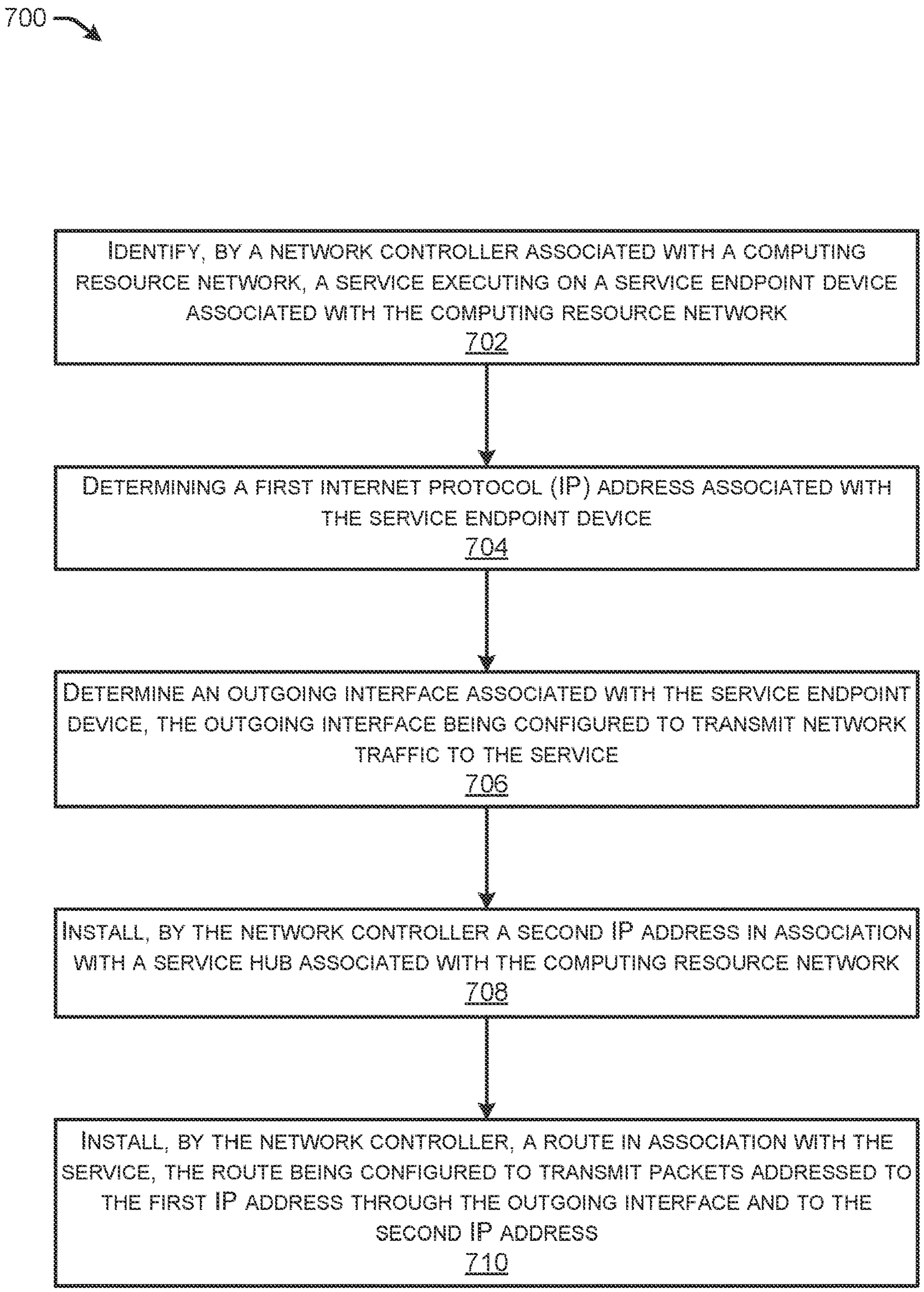
FIG. 7 illustrates a flow diagram of another example method for a network controller to install route(s) utilized for behind-the-service IP tracking for IPv4 and/or IPv6 connected services over physical interface(s).

FIG. 7 illustrates a flow diagram of another example method 700 for a network controller to install route(s) utilized for behind-the-service IP tracking for IPv4 and/or IPv6 connected services over physical interface(s). In some examples, the network controller, the service(s), and/or the behind-the-service IP may correspond to the network controller 106, the service(s) 112, and/or the behind-the-service IPs 128 as described with respect to FIGS. 1 and 2.

At 702, the method 700 includes identifying, by a network controller associated with a computing resource network, a service executing on a service endpoint device associated with the computing resource network. In some examples, the computing resource network and/or the service endpoint device may correspond to the computing resource network 102 and/or the service endpoint device(s) 110 as described with respect to FIGS. 1 and 2.

At 704, the method 700 includes determining a first internet protocol (IP) address associated with the service endpoint device. In some examples, the first IP address may correspond to the transport IP indicator 216 as described with respect to FIG. 2.

At 706, the method 700 includes determining an outgoing interface associated with the service endpoint device, the outgoing interface being configured to transmit network traffic to the service. In some examples, the outgoing interface may correspond to the outgoing interface indicator 218 as described with respect to FIG. 2.

At 708, the method 700 includes installing, by the network controller, a second IP address in association with a service hub associated with the computing resource network. In some examples, the second IP address may correspond to a behind-the-service IP address 128 as described with respect to FIGS. 1 and 2, such as, for example IP4 128(2).

At 710, the method 700 includes installing, by the network controller, a route in association with the service. In some examples, the route may be configured to transmit packets addressed to the first IP address through the outgoing interface and to the second IP address.

In some examples, the second IP address is configured as a loopback address associated with the service hub.

In some examples, the route may be a first route. Additionally, or alternatively, the method 700 includes installing a third IP address in association with the service. In some examples, the third IP address may be provisioned as an endpoint executing behind the service on the service endpoint device. Additionally, or alternatively, the method 700 includes installing a second route in association with the service. In some examples, the second route may be configured to transmit network traffic addressed to the first IP address through the outgoing interface and to the third IP address.

Additionally, or alternatively, the method 700 includes receiving route information from a client device associated with the network traffic. In some examples, the route information may indicate the outgoing interface and the first IP address. Additionally, or alternatively, the method 700 includes based at least in part on receiving the route information determining the outgoing interface, determining the first IP address, and/or installing the second IP address.

In some examples, the network traffic is received from the service hub and/or the second IP address is configured as an endpoint executing on the service hub.

Figure 8:
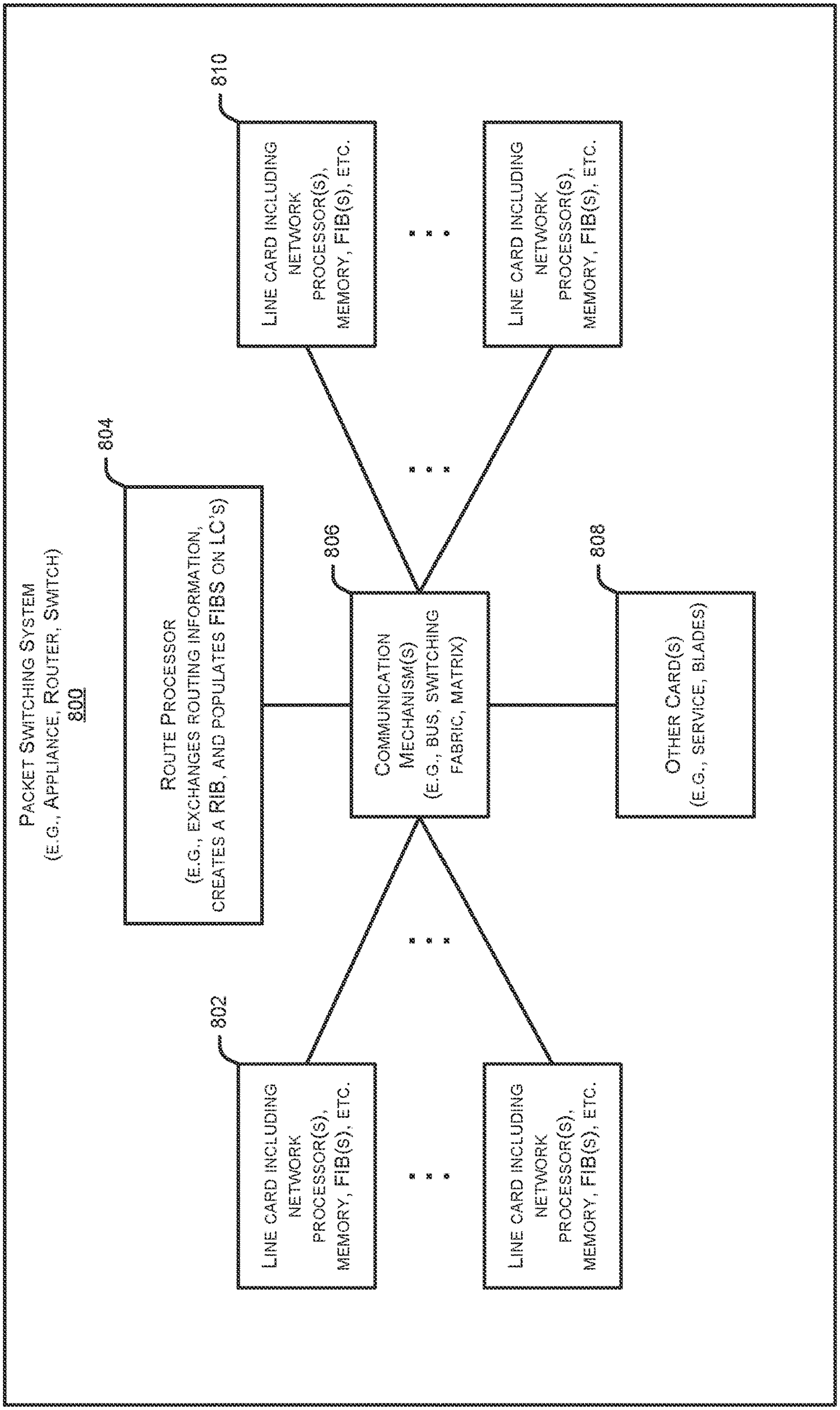
FIG. 8 illustrates a block diagram illustrating an example packet switching system that can be utilized to implement various aspects of the technologies disclosed herein.

FIG. 8 illustrates a block diagram illustrating an example packet switching device (or system) 800 that can be utilized to implement various aspects of the technologies disclosed herein. In some examples, packet switching device(s) 800 may be employed in various networks, such as, for example, the computing resource network 102 as described with respect to FIGS. 1 and 2, respectively.

In some examples, a packet switching device 800 may comprise multiple line card(s) 802, 810, each with one or more network interfaces for sending and receiving packets over communications links (e.g., possibly part of a link aggregation group). The packet switching device 800 may also have a control plane with one or more processing elements 804 for managing the control plane and/or control plane processing of packets associated with forwarding of packets in a network. The packet switching device 800 may also include other cards 808 (e.g., service cards, blades) which include processing elements that are used to process (e.g., forward/send, drop, manipulate, change, modify, receive, create, duplicate, apply a service) packets associated with forwarding of packets in a network. The packet switching device 800 may comprise hardware-based communication mechanism 806 (e.g., bus, switching fabric, and/or matrix, etc.) for allowing its different entities 802, 804, 808 and 810 to communicate. Line card(s) 802, 810 may typically perform the actions of being both an ingress and/or an egress line card 802, 810, in regard to multiple other particular packets and/or packet streams being received by, or sent from, packet switching device 800.

Figure 9:
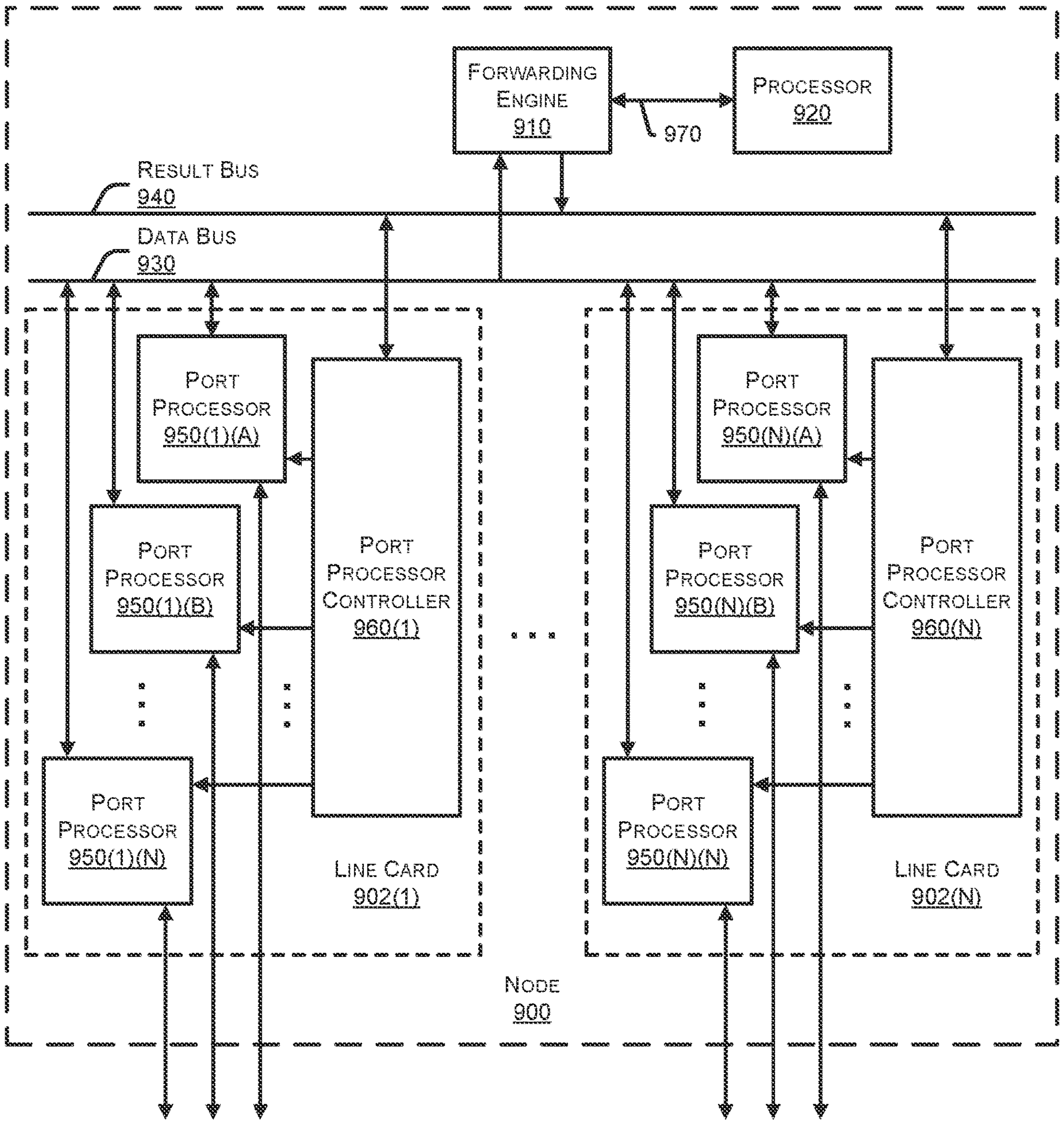
FIG. 9 illustrates a block diagram illustrating certain components of an example node that can be utilized to implement various aspects of the technologies disclosed herein.

FIG. 9 illustrates a block diagram illustrating certain components of an example node 900 that can be utilized to implement various aspects of the technologies disclosed herein. In some examples, node(s) 900 may be employed in various networks, such as, for example, the computing resource network 102 as described with respect to FIGS. 1 and 2, respectively.

In some examples, node 900 may include any number of line cards 902 (e.g., line cards 902(1)-(N), where N may be any integer greater than 1) that are communicatively coupled to a forwarding engine 910 (also referred to as a packet forwarder) and/or a processor 920 via a data bus 930 and/or a result bus 940. Line cards 902(1)-(N) may include any number of port processors 950(1)(A)-(N)(N) which are controlled by port processor controllers 960(1)-(N), where N may be any integer greater than 1. Additionally, or alternatively, forwarding engine 910 and/or processor 920 are not only coupled to one another via the data bus 930 and the result bus 940, but may also communicatively coupled to one another by a communications link 970.

The processors (e.g., the port processor(s) 950 and/or the port processor controller(s) 960) of each line card 902 may be mounted on a single printed circuit board. When a packet or packet and header are received, the packet or packet and header may be identified and analyzed by node 900 (also referred to herein as a router) in the following manner. Upon receipt, a packet (or some or all of its control information) or packet and header may be sent from one of port processor(s) 950(1)(A)-(N)(N) at which the packet or packet and header was received and to one or more of those devices coupled to the data bus 930 (e.g., others of the port processor(s) 950(1)(A)-(N)(N), the forwarding engine 910 and/or the processor 920). Handling of the packet or packet and header may be determined, for example, by the forwarding engine 910. For example, the forwarding engine 910 may determine that the packet or packet and header should be forwarded to one or more of port processors 950(1)(A)-(N)(N). This may be accomplished by indicating to corresponding one(s) of port processor controllers 960(1)-(N) that the copy of the packet or packet and header held in the given one(s) of port processor(s) 950(1)(A)-(N)(N) should be forwarded to the appropriate one of port processor(s) 950(1)(A)-(N)(N). Additionally, or alternatively, once a packet or packet and header has been identified for processing, the forwarding engine 910, the processor 920, and/or the like may be used to process the packet or packet and header in some manner and/or may add packet security information in order to secure the packet. On a node 900 sourcing such a packet or packet and header, this processing may include, for example, encryption of some or all of the packet's or packet and header's information, the addition of a digital signature, and/or some other information and/or processing capable of securing the packet or packet and header. On a node 900 receiving such a processed packet or packet and header, the corresponding process may be performed to recover or validate the packet's or packet and header's information that has been secured.

Figure 10:
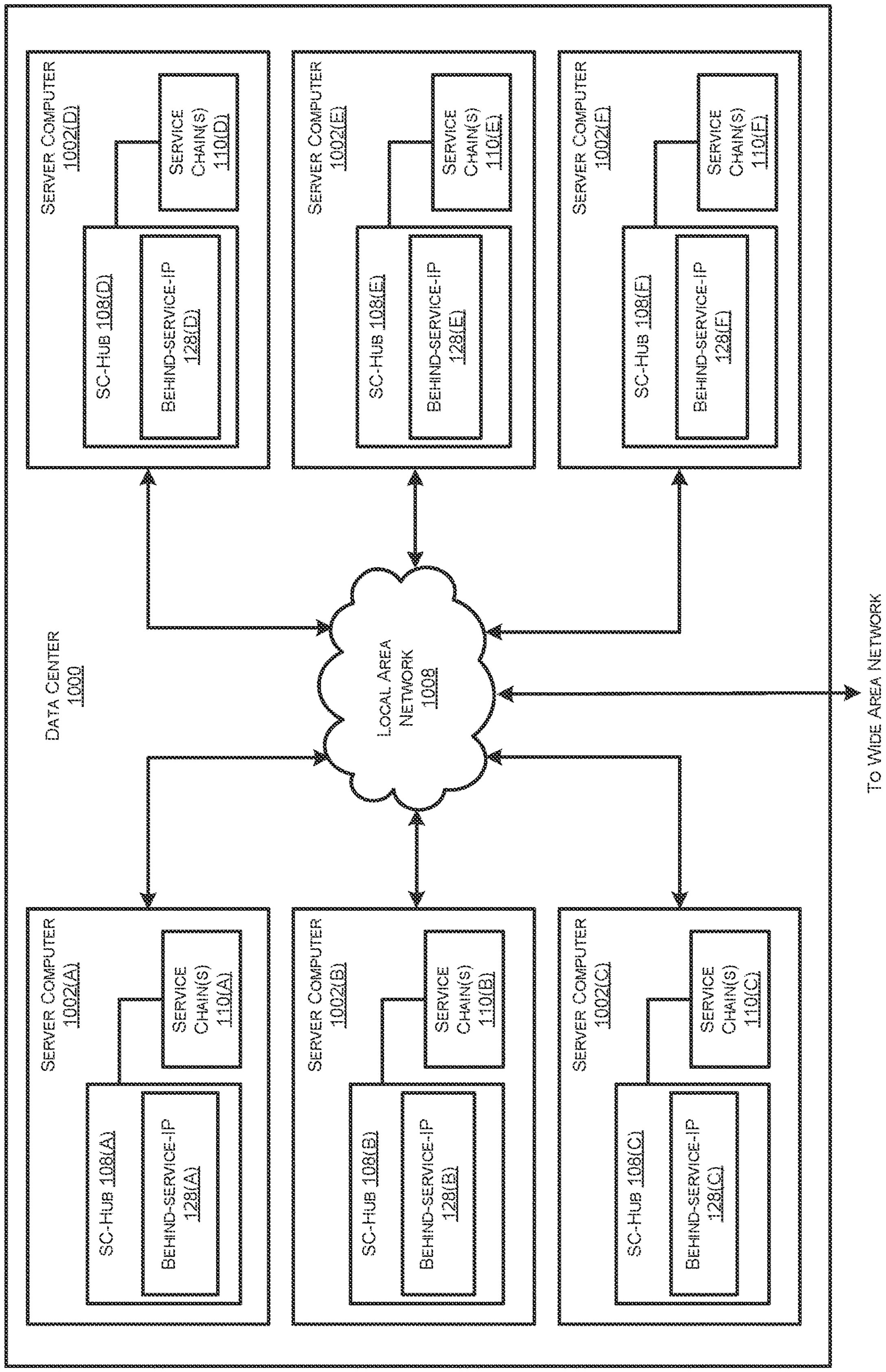
FIG. 10 illustrates a computing system diagram illustrating a configuration for a data center that can be utilized to implement aspects of the technologies disclosed herein.

FIG. 10 is a computing system diagram illustrating a configuration for a data center 1000 that can be utilized to implement aspects of the technologies disclosed herein. The example data center 1000 shown in FIG. 10 includes several server computers 1002A-1002E (which might be referred to herein singularly as "a server computer 1002" or in the plural as "the server computers 1002") for providing computing resources. In some examples, the server computers 1002 may include, or correspond to, the servers associated with the site (or data center) 104, the packet switching system 800, and/or the node 900 described herein with respect to FIGS. 1, 8 and 9, respectively.

The server computers 1002 can be standard tower, rack-mount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 1002 can also be configured to execute a resource manager capable of instantiating and/or managing the computing resources. In the case of VM instances, for example, the resource manager can be a hypervisor or another type of program configured to enable the execution of multiple VM instances on a single server computer 1002. Server computers 1002 in the data center 1000 can also be configured to provide network services and other types of services.

In the example data center 1000 shown in FIG. 10, an appropriate LAN 1008 is also utilized to interconnect the server computers 1002A-1002E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1000, between each of the server computers 1002A-1002E in each data center 1000, and, potentially, between computing resources in each of the server computers 1002. It should be appreciated that the configuration of the data center 1000 described with reference to FIG. 10 is merely illustrative and that other implementations can be utilized.

In some examples, the server computers 1002 may each execute a watermark component 118 comprising an encoder 124 and/or a decoder 122. Additionally, or alternatively, the server computers 1002 may each store a certificate database 120.

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resource network 102 can also be configured to provide other types of computing resources not mentioned specifically herein.

The computing resources provided by the computing resource network 102 may be enabled in one embodiment by one or more data centers 1000 (which might be referred to herein singularly as "a data center 1000" or in the plural as "the data centers 1000"). The data centers 1000 are facilities utilized to house and operate computer systems and associated components. The data centers 1000 typically include redundant and backup power, communications, cooling, and security systems. The data centers 1000 can also be located in geographically disparate locations. One illustrative embodiment for a data center 1000 that can be utilized to implement the technologies disclosed herein will be described below with regard to FIG. 11.

Figure 11:
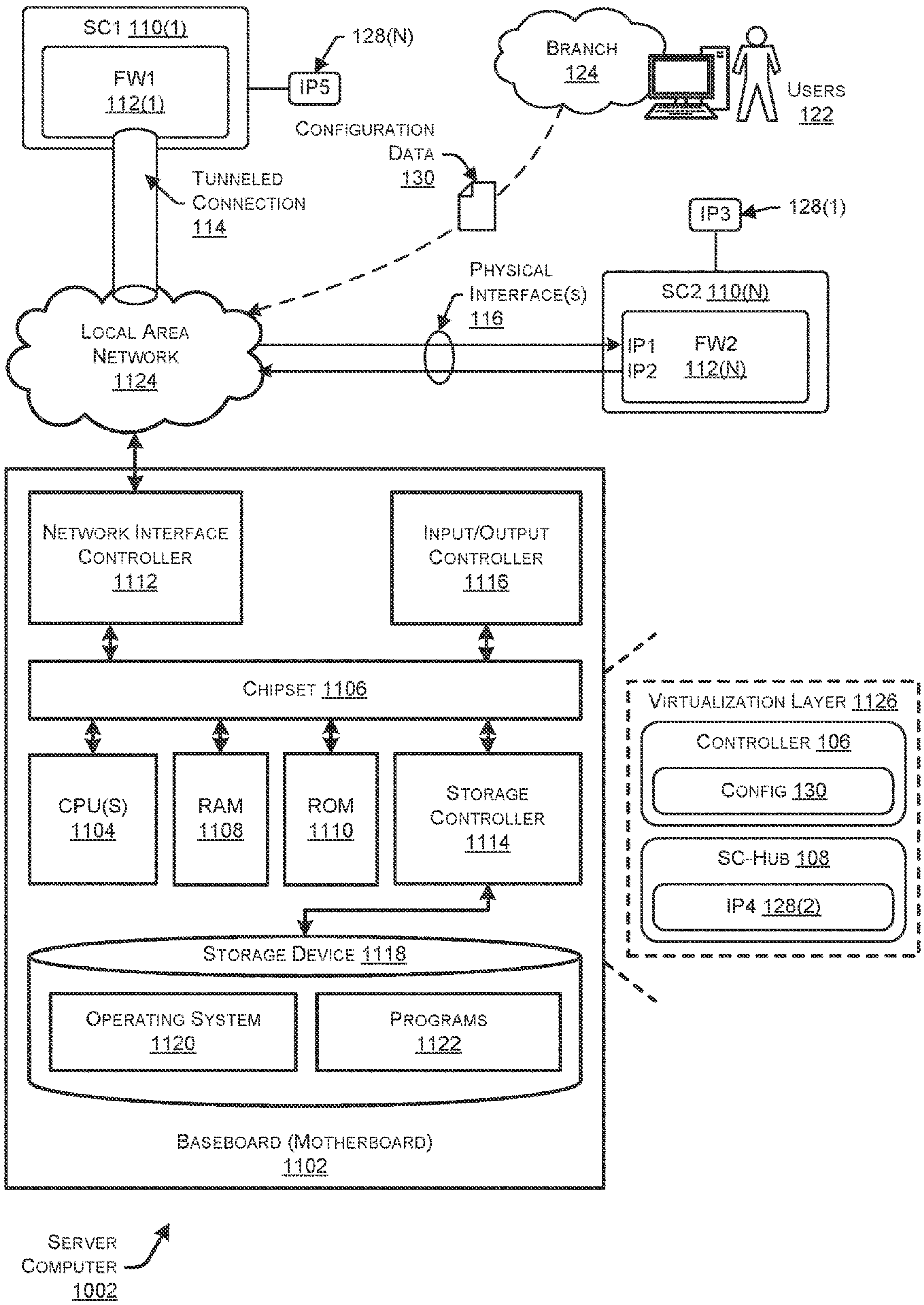
FIG. 11 is a computer architecture diagram showing an illustrative computer hardware architecture for implementing a server device that can be utilized to implement aspects of the various technologies presented herein.

FIG. 11 shows an example computer architecture for a computing device (or network routing device) 1002 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The computing device 1002 may, in some examples, correspond to a physical server of a data center 104, the packet switching system 800, and/or the node 900 described herein with respect to FIGS. 1, 8, and 9, respectively.

The computing device 1002 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computing device 1002.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computing device 1002. The chipset 1106 can further provide an interface to a computer-readable storage medium such as a read-only memory ("ROM") 1110 or non-volatile RAM ("NVRAM") for storing basic routines that help to startup the computing device 1002 and to transfer information between the various components and devices. The ROM 1110 or NVRAM can also store other software components necessary for the operation of the computing device 1002 in accordance with the configurations described herein.

The computing device 1002 can operate in a networked environment using logical connections to remote computing devices and computer systems through a network, such as the network 1124 (or 1008). The chipset 1106 can include functionality for providing network connectivity through a NIC 1112, such as a gigabit Ethernet adapter. The NIC 1112 is capable of connecting the computing device 1002 to other computing devices over the network 1124. It should be appreciated that multiple NICs 1112 can be present in the computing device 1002, connecting the computer to other types of networks and remote computer systems.

The computing device 1002 can be connected to a storage device 1118 that provides non-volatile storage for the computing device 1002. The storage device 1118 can store an operating system 1120, programs 1122, and data, which have been described in greater detail herein. The storage device 1118 can be connected to the computing device 1002 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1002 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computing device 1002 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1002 can further read information from the storage device 1118 by detecting the physical states or characteristics of one or more particular locations within the physical storage units.

In addition to the mass storage device 1118 described above, the computing device 1002 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1002. In some examples, the operations performed by the computing resource network 102, and or any components included therein, may be supported by one or more devices similar to computing device 1002. Stated otherwise, some or all of the operations performed by the computing resource network 102, and or any components included therein, may be performed by one or more computing device 1002 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("IHD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computing device 1002. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1118 can store other system or application programs and data utilized by the computing device 1002.

In one embodiment, the storage device 1118 or other computer-readable storage media is encoded with computer-executable instructions which, when loaded into the computing device 1002, transform the computer from a general-purpose computing system into a special-purpose computer capable of implementing the embodiments described herein. These computer-executable instructions transform the computing device 1002 by specifying how the CPUs 1104 transition between states, as described above. According to one embodiment, the computing device 1002 has access to computer-readable storage media storing computer-executable instructions which, when executed by the computing device 1002, perform the various processes described above with regard to FIGS. 2 and 4-7. The computing device 1002 can also include computer-readable storage media having instructions stored thereupon for performing any of the other computer-implemented operations described herein.

The computing device 1002 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computing device 1002 might not include all of the components shown in FIG. 11, can include other components that are not explicitly shown in FIG. 11, or might utilize an architecture completely different than that shown in FIG. 11.

The server computer 1002 may support a virtualization layer 1126, such as one or more components associated with the computing resource network 102, such as, for example, the network controller 106 and/or the SC-hub 108. The network controller 106 may include the configuration data 130 and may utilize the configuration data to orchestrate routes for behind-the-service endpoint tracking to determine the status of services of a service chain. Additionally, or alternatively, the SC-hub 108 may include a behind-the-service endpoint (e.g., IP4) 128(2) that may be utilized for behind-the-service status tracking, according to the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:

one or more processors; and one or more computer-readable media storing computer-executable instructions that, when executed by the one or more processors, cause the one or more processors to perform operations comprising:

identifying, by a network controller associated with a computing resource network, a service executing on a service endpoint device associated with the computing resource network;

determining a first internet protocol (IP) address associated with the service endpoint device;

determining an outgoing interface of the service endpoint device, the outgoing interface being configured to transmit network traffic to the service;

installing, by the network controller, a second IP address in association with the service; and installing, by the network controller, a route in association with the service, the route being configured to transmit probe packets addressed to the first IP address through the outgoing interface and to the second IP address, wherein the probe packets are sent from a service hub associated with the service endpoint device and are configured to indicate an operational state of the service.

2. The system of claim 1, wherein the second IP address is configured as a loopback address associated with the service endpoint device.

3. The system of claim 1, wherein the second IP address is provisioned as an endpoint executing behind the service on the service endpoint device.

4. The system of claim 1, wherein the route is a first route, and the operations further comprising:

installing a third IP address in association with the service; and installing a second route in association with the service, the second route being configured to transmit network traffic addressed to the first IP address through the outgoing interface and to the third IP address.

5. The system of claim 1, wherein the network traffic is received from a service hub communicatively coupled to the service endpoint device, and the second IP address is configured as an endpoint executing on the service hub.

6. The system of claim 1, the operations further comprising:

receiving route information from a customer device associated with the network traffic, the route information indicating the outgoing interface, the first IP address, and the second IP address; and based at least in part on receiving the route information:

determining the outgoing interface;

determining the first IP address; and installing the second IP address.

7. The system of claim 1, the operations further comprising based at least in part on the operational state of the service indicated by the probe packets, selectively advertising a route associated with the service to one or more branch networks communicatively coupled to the computing resource network via the service hub.

8. The system of claim 1, wherein the first IP address is one of an IP version 4 (IPv4) address or an IP version 6 (IPv6) address.

9. A method comprising:

identifying, by a network controller associated with a computing resource network, a service executing on a service endpoint device associated with the computing resource network;

determining a tunnel interface associated with the service endpoint device, the tunnel interface configured to transmit network traffic to the service;

installing, by the network controller, an IP address in association with the service; and installing, by the network controller, a route in association with the service, the route being configured to transmit probe packets addressed to the service endpoint device through the tunnel interface and to the IP address, wherein the probe packets are sent from a service hub associated with the service endpoint device and are configured to indicate an operation state of the service.

10. The method of claim 9, wherein the IP address is configured as a loopback address associated with the service endpoint device.

11. The method of claim 9, wherein the IP address is provisioned as an endpoint executing behind the service on the service endpoint device.

12. The method of claim 9, wherein the network traffic is received from a service hub communicatively coupled to the service endpoint device, and the IP address is configured as an endpoint executing on the service hub.

13. The method of claim 9, further comprising:

receiving route information from a client device associated with the network traffic, the route information indicating the tunnel interface and the IP address; and based at least in part on receiving the route information:

determining the tunnel interface; and installing the IP address.

14. The method of claim 9, wherein the route is a first route and the IP address is a first IP address, and the method further comprising:

installing a second IP address in association with a service hub associated with the computing resource network; and installing a second route in association with the service, the second route being configured to transmit network traffic addressed to the service endpoint device through the tunnel interface and to the second IP address.

15. The method of claim 9, further comprising based at least in part on an operational state of the service indicated by probe packets transmitted via the route, selectively advertising a route associated with the service to one or more branch networks communicatively coupled to the computing resource network via a service hub associated with the service endpoint device.

16. A system comprising:

one or more processors; and one or more computer-readable media storing computer-executable instructions that, when executed by the one or more processors, cause the one or more processors to perform operations comprising:

identifying, by a network controller associated with a computing resource network, a service executing on a service endpoint device associated with the computing resource network;

determining a first internet protocol (IP) address associated with the service endpoint device;

determining an outgoing interface associated with the service endpoint device, the outgoing interface being configured to transmit network traffic to the service;

installing, by the network controller, a second IP address in association with a service hub associated with the computing resource network; and installing, by the network controller, a route in association with the service, the route being configured to transmit probe packets addressed to the first IP address through the outgoing interface and to the second IP address, wherein the probe packets are configured to indicate an operational state of the service.

17. The system of claim 16, wherein the second IP address is configured as a loopback address associated with the service hub.

18. The system of claim 16, wherein the route is a first route, and the operations further comprising:

installing a third IP address in association with the service, the third IP address being provisioned as an endpoint executing behind the service on the service endpoint device; and installing a second route in association with the service, the second route being configured to transmit network traffic addressed to the first IP address through the outgoing interface and to the third IP address.

19. The system of claim 16, the operations further comprising:

receiving route information from a client device associated with the network traffic, the route information indicating the outgoing interface and the first IP address; and based at least in part on receiving the route information:

determining the outgoing interface;

determining the first IP address; and installing the second IP address.

20. The system of claim 16, wherein the network traffic is received from the service hub and the second IP address is configured as an endpoint executing on the service hub.

* * * * *